United States Patent
Herbst-Dederichs et al.

(10) Patent No.: US 8,857,820 B2
(45) Date of Patent: Oct. 14, 2014

(54) PISTON RING

(75) Inventors: Christian Herbst-Dederichs, Bornheim (DE); Peter-Klaus Esser, Kürten (DE); Ralf Lammers, Wermelskirchen (DE); Sebastian Bresinski, Langenfeld (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 380 days.

(21) Appl. No.: 13/508,799

(22) PCT Filed: Oct. 14, 2010

(86) PCT No.: PCT/EP2010/065458
§ 371 (c)(1),
(2), (4) Date: May 9, 2012

(87) PCT Pub. No.: WO2011/057875
PCT Pub. Date: May 19, 2011

(65) Prior Publication Data
US 2012/0228831 A1     Sep. 13, 2012

(30) Foreign Application Priority Data
Nov. 10, 2009 (DE) .................. 10 2009 052 587

(51) Int. Cl.
*F16J 9/26* (2006.01)
*F16J 9/14* (2006.01)

(52) U.S. Cl.
CPC ..... *F16J 9/14* (2013.01); *F16J 9/26* (2013.01)

USPC ............................................. 277/442; 277/493

(58) Field of Classification Search
CPC ......................................................... F16J 9/26
USPC ........................................... 277/440–444, 493
See application file for complete search history.

(56) References Cited

U.S. PATENT DOCUMENTS

| | | | |
|---|---|---|---|
| 1,278,015 A | * | 9/1918 | Richards et al. ............... 427/284 |
| 6,715,767 B1 | * | 4/2004 | Meernik et al. ................ 277/459 |
| 7,052,019 B2 | * | 5/2006 | Miida ............................ 277/443 |

FOREIGN PATENT DOCUMENTS

| | | | | |
|---|---|---|---|---|
| DE | 21355338 A1 | * | 1/1973 | ................. F16J 9/14 |
| DE | 10 2007 00796 A1 | | 8/2008 | |
| JP | 00120866 | | 4/2000 | |
| JP | 2001 295688 A | | 10/2001 | |

* cited by examiner

*Primary Examiner* — Vishal Patel
(74) *Attorney, Agent, or Firm* — Robert L. Stearns; Dickinson Wright, PLLC

(57) ABSTRACT

A piston ring, in particular a compression piston ring, includes a running surface, upper and lower flank areas, an inner peripheral area and a joint. The wall thickness of the piston ring is uniform over its periphery and at least the running surface is provided with a PVD coating or a CVD layer in such a manner that the running surface layer has a lesser layer thickness in the peripheral area close to the joint than in the remaining peripheral area of the running surface.

10 Claims, 1 Drawing Sheet

PISTON RING

BACKGROUND OF THE INVENTION

1. Technical Field

The invention relates to a piston ring, in particular a compression piston ring.

2. Related Art

The running surfaces of piston rings, in particular compression piston rings in internal combustion engines, experience a particular stress on the ring joint ends due to thermal and mechanical impingement. This typically results in excessive wear at this location and possibly thermal overload and subsequent corrosion. The joint area is therefore one of the most essential weak points for the service life of the piston ring, in particular the compression piston ring.

Providing piston rings with hard coatings is generally known. However, in general these cannot prevent the partial phenomenon in the area of the ring joint ends. The radial pressure distribution can be optimized so that the joint pressure is reduced to relieve the joint areas. The introduction of radial cross-sectional weakened areas, preferably in the first and fourth quadrants, can cause a specific pressure relief. However, all measures together have not entirely remedied the phenomenon of joint overload, in particular in the case of piston rings constructed having an axially low height.

U.S. Pat. No. 1,278,015 discloses a piston ring, which is implemented as thinner in the joint area. The running surface of the piston ring is coated using tin, this tin layer being able to be implemented as thinner at the joint than in the remaining peripheral area.

A piston ring is known from JP 00120866 A, which includes a running surface, upper and lower flank areas, and an inner peripheral surface. The area of the inner peripheral surface is provided in the area of the joint ends with a cross-sectional weakened area.

SUMMARY OF THE INVENTION

The invention is based on the object, to reduce the excess joint wear, in particular in the case of piston rings axially constructed having a low height, to provide a lubrication-improved running surface topography, in order to achieve an improved service life of the piston ring in this way.

This object is achieved by a piston ring, in particular a compression piston ring, including a running surface, upper and lower flank areas, an inner peripheral surface, and a joint, the wall thickness of the piston ring, considered over its periphery, being implemented as equal and at least the running surface being provided with a PVD layer or a CVD layer, in such a manner that the running surface layer has a lesser layer thickness in the peripheral area close to the joint than in the remaining peripheral area of the running surface.

A different surface quality can now be caused by the object of the invention in the highly loaded area close to the joint than in the remaining peripheral area of the piston ring, in particular a compression piston ring axially constructed having a low height.

The roughness in the joint area moves between 0.8-1.2 μm, while the remaining running surface has a roughness <0.08 μm in its lapped state, for example.

Because the peripheral area of the piston ring close to the joint, which is reduced in the layer thickness, is also not affected by this processing in the event of processing of the peripheral area of the piston ring, this peripheral area close to the joint is rougher than the remaining peripheral surface. Better oil storage ability in the area close to the joint can be achieved by this measure.

It is also conceivable, to achieve different surface qualities, to use different abrasion methods in the peripheral areas close to the joint, on the one hand, and in the remaining area of the piston ring, on the other hand, in order to thus generate different running surface topographies in a targeted manner.

Lapping suggests itself in this case as an abrasion method. The respective area close to the joint is defined, according to a further concept of the invention, by a section originating from the respective joint edge and comprising a peripheral angle <20°, in particular <10°.

The execution of the running surface coating on the piston ring is to be performed so that the surface is maintained as before in the area close to the joint, even after a typical installation procedure in engine operation, and has not experienced smoothing due to the existing combustion conditions.

Similarly to the prior art, it can be advisable for specific applications to reduce the peripheral areas of the piston ring close to the joint before the coating.

Known CrN, CrON, CrAlN, multilayer, DLC, TI, or other layers based on hard materials are considered as the PVD layers.

THE DRAWINGS

The object of the invention is shown in the drawing on the basis of an exemplary embodiment and is described hereafter. In the figures.

DETAILED DESCRIPTION

Figure 1:
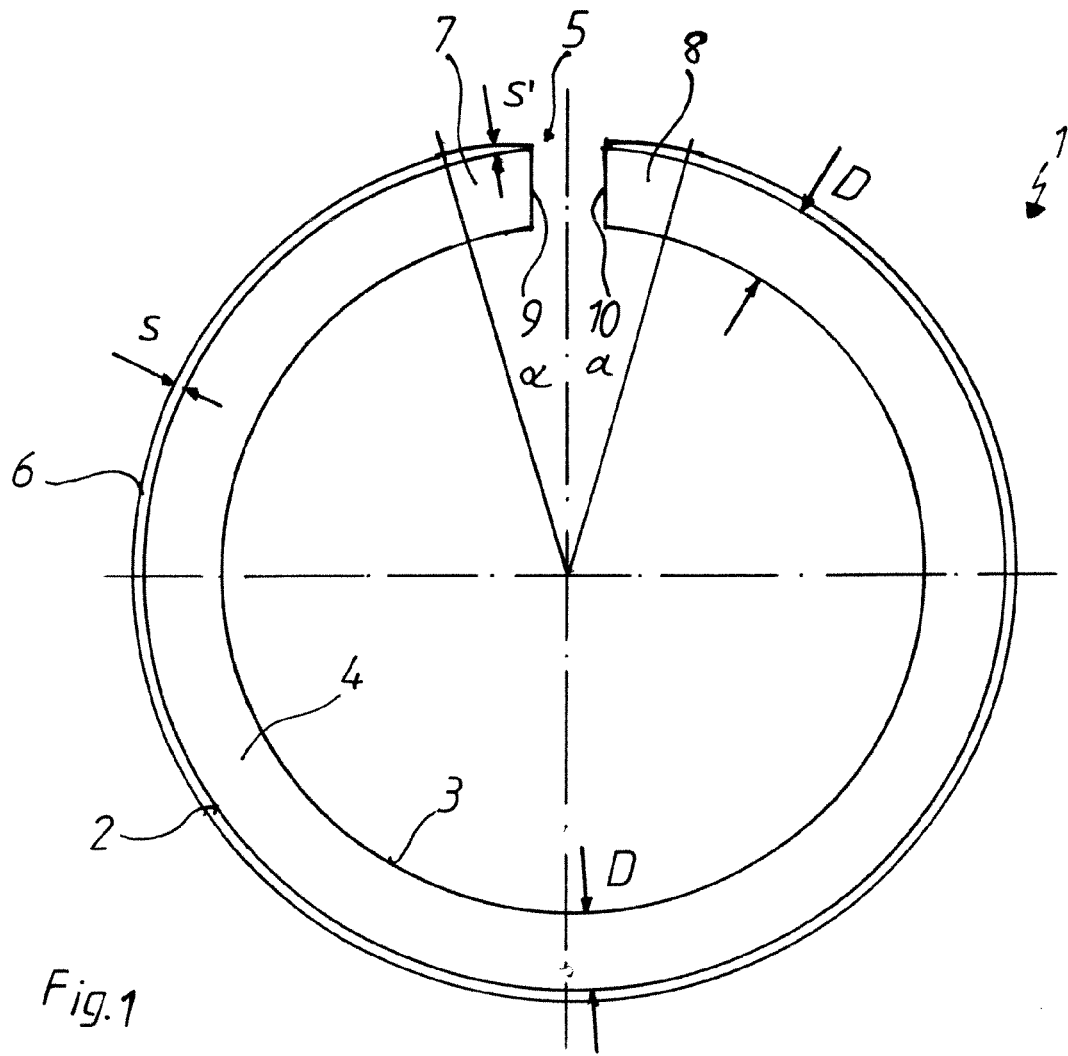
FIG. 1 shows a top view of the piston ring according to the invention.

FIG. 1 shows a piston ring 1 according to the invention, which is to be formed in this example by a compression piston ring. The piston ring 1 contains an outer running surface 2, an inner peripheral surface 3, and upper and lower flank areas 4. In addition, the piston ring 1 has a joint 5. The wall thickness D of the piston ring 1 is implemented as essentially equal, considered over its entire peripheral length. The running surface 2 is provided in this example with a PVD layer 6, for example, a CrN layer. As can be inferred from FIG. 1, a peripheral area 7, 8 close to the joint is formed in the area of the joint 5 in each case, which extends in this example, originating from the respective joint edge 9, 10, over a peripheral angle α of 10°. The layer thickness s is implemented equally outside the respective area 7, 8 close to the joint. It is assumed to be 30 μm for this example.

In contrast, the layer thickness s' is reduced by 8 μm in this example in the areas 7, 8 close to the joint, i.e., it has a layer thickness of 22 μm. These values are assumed values and can also be different depending on the respective usage case. After the coating of the running surface 2, the layer s is subjected to a peripheral processing, for example, by lapping. Because the layer thickness s' is dimensioned as smaller than the layer thickness s, no material abrasion is generated during this peripheral treatment in the areas 7, 8 close to the joint. Therefore, a different surface quality is generated by this measure outside the areas 7, 8 close to the joint than in the respective area 7, 8 close to the joint. In this example, the CrN coating having the material thickness s' is not to be subjected to further surface treatment, so that it remains in the coating status. Therefore, a greater roughness is provided here in relation to the remaining peripheral surface. The same is to be assumed as follows for this example: 0.9 μm in the respective joint area. The remaining lapped running surface area is to have a roughness <0.05 μm. Through this increased roughness in the areas 7, 8 close to the joint, a better oil storage capability can be achieved.

Figure 2:
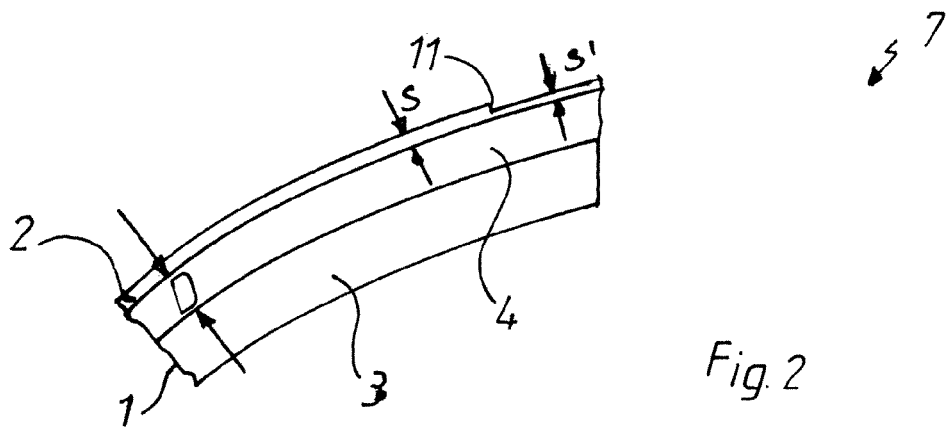
FIG. 2 shows a partial view of one of the end areas close to the joint of the piston ring according to FIG. 1.

FIG. 2 shows a partial view of an end area 7 close to the joint. The outer running surface 2, the inner peripheral surface 3, and the upper flank area 4 are recognizable. Furthermore, the different layer thicknesses s and s' are recognizable. With uniform wall thickness D of the piston ring 1, the layer thickness s' is somewhat recessed in the area 7 close to the joint and is therefore not subjected to a following peripheral processing of the running surface 2. The transition from the layer thickness s into the layer thickness s' is formed here by a recess 11.

The invention claimed is:

1. A piston ring including an outer peripheral running surface, upper and lower flank areas, an inner peripheral surface, and a joint having opposing ends, wherein the wall thickness (D) of the piston ring, considered over the periphery, is uniform and at least the running surface is provided with a single PVD or CVD layer in such a manner that the running surface layer, in a portion of the peripheral areas close to the joint originating from a respective joint edge of the joint up to a peripheral angle ($\alpha$)<200, has a greater roughness than in remaining portions of the peripheral area of the running surface and a lesser layer thickness (s') than the layer thickness (s) in said remaining portions of the peripheral area of the running surface.

2. The piston ring according to claim 1, wherein the layer thickness (s) is between 20 and 50 μm and is reduced by 1 to 10 μm in the peripheral areas close to the joint.

3. The piston ring according to claim 1, wherein the transition from the layer thickness (s) into the layer thickness (s') in the respective peripheral area close to the joint is performed by forming a recess.

4. The piston ring according to claim 1, wherein the peripheral areas reduced in layer thickness have a roughness in the range from 0.8 to 1.2 μm.

5. The piston ring according to claim 1, wherein the roughness outside the peripheral areas reduced in layer thickness is <0.08 μm.

6. A method for producing a piston ring, comprising:
providing a piston ring, including an outer peripheral running surface, upper and lower flank areas, an inner peripheral surface, and a joint having opposing ends, the wall thickness (D) of the piston ring being uniform over the periphery;
coating at least the running surface using a single PVD or CVD layer, so that the running surface layer in a portion of the peripheral areas close to the joint originating from a respective joint edge of the joint up to a peripheral angle ($\alpha$)<200, has a lesser layer thickness (s') than the layer thickness (s) in remaining portions of the peripheral area of the running surface; and
peripheral processing of the running surface, so that the running surface layer receives a lesser roughness in said remaining portions of the peripheral area than in said portion of the peripheral areas close to the joint.

7. The method according to claim 6, wherein the ratio of the different layer thicknesses (s:s') is such that during the peripheral processing of the running surface, or the running surface layer, following the coating, the respective area of the piston ring close to the joint is not subjected to the peripheral processing.

8. The method according to claim 6, wherein the peripheral area reduced in layer thickness remains in the state of the coating during the processing of the running surface, or the running surface layer.

9. The method according to claim 6, wherein the peripheral processing comprises lapping.

10. The method according to claim 6, wherein the peripheral processing uses different material operating methods in the peripheral areas close to the joint, on the one hand, and the remaining peripheral area, on the other hand.

* * * * *